(12) United States Patent
Prakash et al.

(10) Patent No.: US 12,547,348 B2
(45) Date of Patent: Feb. 10, 2026

(54) SIGNAL LOCKING

(71) Applicant: Micron Technology, Inc., Boise, ID (US)

(72) Inventors: Gyan Prakash, Bangalore (IN); Jose Rey C. De Luna, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/789,249

(22) Filed: Jul. 30, 2024

(65) Prior Publication Data

US 2025/0053341 A1 Feb. 13, 2025

Related U.S. Application Data

(60) Provisional application No. 63/518,490, filed on Aug. 9, 2023.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061

USPC ................................................. 711/154, 100
See application file for complete search history.

(56) References Cited

U.S. PATENT DOCUMENTS

| | | | |
|---|---|---|---|
| 9,405,355 B2 | 8/2016 | Bahirat | |
| 2022/0083270 A1* | 3/2022 | Suzuki | .................. G06F 3/0679 |
| 2022/0413768 A1* | 12/2022 | Lee | ........................... G11C 8/06 |
| 2024/0069783 A1 | 2/2024 | Roberts | |
| 2024/0078024 A1 | 3/2024 | Ge | |

* cited by examiner

*Primary Examiner* — Hosain T Alam
*Assistant Examiner* — Zubair Ahmed
(74) *Attorney, Agent, or Firm* — Brooks, Cameron & Huebsch, PLLC

(57) ABSTRACT

A method includes receiving, by a memory device interface, a first operation command targeted for receipt by a memory device coupled to the memory device interface causing, responsive to receiving the first operation command, a chip enable signal to be asserted in a first state to filter commands received by the memory device interface that are targeted for subsequent receipt by the memory device, receiving, by the memory device interface, a second operation command targeted for receipt by a memory device coupled to the memory device interface, and causing, responsive to receiving the second operation command, the chip enable signal to be asserted in a second state to allow commands received by the memory device interface that are targeted for subsequent receipt by the memory device to be received by the memory device.

20 Claims, 5 Drawing Sheets

SIGNAL LOCKING

PRIORITY INFORMATION

This Application claims the benefit of U.S. Provisional Application No. 63/518,490, filed on Aug. 9, 2023, the contents of which are incorporated herein by reference.

TECHNICAL FIELD

Embodiments of the disclosure relate generally to memory sub-systems, and more specifically, relate to signal locking.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
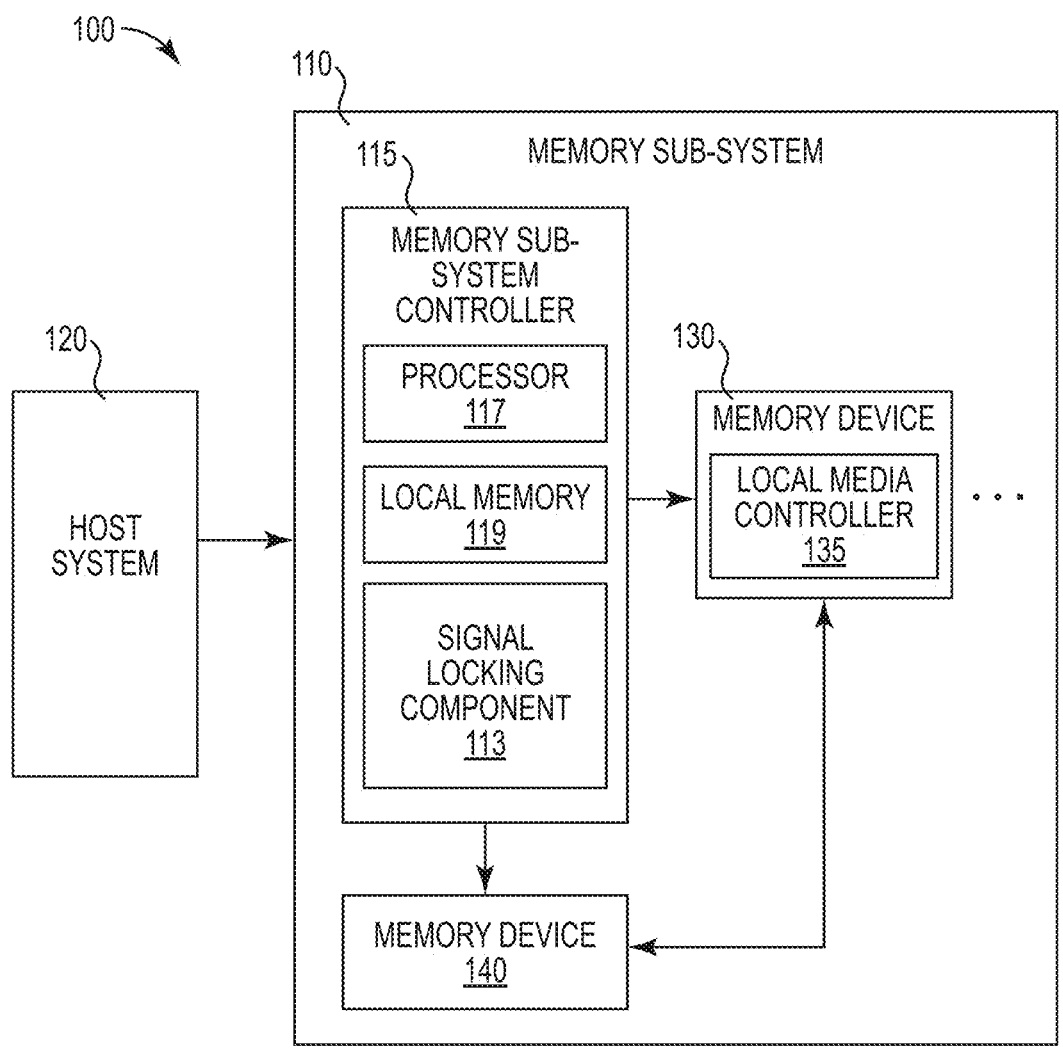
FIG. 1 illustrates an example computing system that includes a memory sub-system in accordance with some embodiments of the disclosure.

Aspects of the present disclosure are directed to signal locking, in particular to memory sub-systems that include a signal locking component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). As used herein, a NAND memory device can include either a set of flash memory dice or a combination of the flash memory dice and a non-volatile memory (NVM) controller. The NVM controller can include circuitry for performing read/write operations as described herein. Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

In some previous approaches, an input/output (IO) expander (IOE) device can be placed between a host and memory dice. For example, an IOE device can be placed between a host device and a plurality of NAND dies (or "LUNs"). In some embodiments, the IOE device can be referred to as a buffer chip or a buffer chip device. The host side of the IOE device can be referred to as a front end (front side) and the memory dice side of the IOE device can be referred to as the back end (back side). The IOE device can allow a host to see a single die load at the IOE device front side (FS). The NAND die loads can be distributed across multiple IOE back side channels. These previous IOE devices can implement a crossbar switch to route the intended traffic to target NAND dies. As used herein, a crossbar switch includes a collection of switches arranged in a matrix configuration. A crossbar switch can have multiple input and output lines that form a crossed pattern of interconnecting lines between which a connection may be established by closing a switch located at each intersection, the elements of the matrix.

In some previous approaches, the IOE device can be implemented with a buffered architecture to allow the crossbar switch to function. In this implementation, all the signals from host to NAND and vice-versa are buffered inside the IOE device and distributed to a desired port of the crossbar switch. In these approaches, the load or load average between the host and the NAND can decrease as a larger quantity of NAND die are added to the system. That is, a previous IOE device will have a lower load capability between the host and the NAND as a greater quantity of NAND dice are added to the system.

In some previous approaches, the IOE device can receive signals at a front end from a host device and provide the signals at a back end to a memory resource. In these previous approaches, the host can send configuration signals to the IOE device to configure the IOE device to be utilized with the memory resource. In these previous approaches, the configuration signals can be received by the IOE device and provided to the memory resource. In some approaches the configuration signals intended for the IOE device can alter or disrupt the functionality of the memory resource. For example, the configuration signals can alter the behavior of the memory resources, causing unexpected behavior such as change in timing or slower speed or unresponsiveness from the memory resources leading to decreased performance or data retrieval errors.

Aspects of the present disclosure address the above and other deficiencies by employing an IOE device that utilizes signal locking. For instance, aspects of the present disclosure can utilize a signal locking component that can be configured to "lock" or prevent signals received at a particular pin of the front end of the IOE device from reaching a back end of the IOE device. In some embodiments, commands from a host device and/or chip enable signals received at a chip enable pin on the front end of the IOE device, can be used as an instruction to lock subsequent chip enable signals received at the front end chip enable pin from propagating to the back end. When the chip enable signals are locked or prevented from propagating to the backend, the IOE device can still utilize the chip enable signal on the front end to receive configuration signals from a host device. In this way, the configuration signals from the host will be filtered out and prevented from being delivered to the back end of the IOE device and/or prevented from being provided to a memory resource (e.g., a memory device, memory die, etc.) coupled to the back end of the IOE device.

FIG. 1 illustrates an example computing system that includes a memory sub-system 110 in accordance with some embodiments of the disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, a MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

As described above, the memory components can be memory dice or memory packages that form at least a portion of the memory device 130. In some embodiments, the blocks of memory cells can form one or more "super-blocks." As used herein, a "superblock" generally refers to a set of data blocks that span multiple memory dice and are written in an interleaved fashion. For instance, in some embodiments each of a number of interleaved NAND blocks can be deployed across multiple memory dice that have multiple planes and/or pages associated therewith. The terms "superblock," "block," "block of memory cells," and/or "interleaved NAND blocks," as well as variants thereof, can, given the context of the disclosure, be used interchangeably.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140. For instance, in some embodiments, the memory device 140 can be a DRAM and/or SRAM configured to operate as a cache for the memory device 130. In such instances, the memory device 130 can be a NAND.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device. The memory sub-system 110 can also include additional circuitry or components that are not illustrated.

The memory sub-system 110 can include a signal locking component 113, which may be referred to in the alternative as a "controller," herein. Although not shown in FIG. 1 so as to not obfuscate the drawings, the signal locking component 113 can include various circuitry to facilitate aspects of media management, as detailed herein. In some embodiments, the signal locking component 113 can include special purpose circuitry in the form of an ASIC, FPGA, state machine, and/or other logic circuitry that can allow the signal locking component 113 to orchestrate and/or perform the operations described herein.

In some embodiments, the memory sub-system controller 115 includes at least a portion of the signal locking component 113. For example, the memory sub-system controller 115 can include a processor 117 (processing device) configured to execute instructions stored in local memory 119 for performing the operations described herein. In some embodiments, the signal locking component 113 is part of the memory sub-system 110, an application, or an operating system.

In a non-limiting example, an apparatus (e.g., the computing system 100) can include a signal locking component 113. The signal locking component 113 can be resident on the memory sub-system 110. As used herein, the term "resident on" refers to something that is physically located on a particular component. For example, the signal locking component 113 being "resident on" the memory sub-system 110 refers to a condition in which the hardware circuitry that comprises the signal locking component 113 is physically located on the memory sub-system 110. The term "resident on" can be used interchangeably with other terms such as "deployed on" or "located on," herein.

As described further herein, the computing system 100 can include an IOE device that can be utilized to connect a host (e.g., host system 120, etc.) to a memory device (e.g., memory device 130, etc.). In some embodiments, the IOE device can be coupled to the host at a front end and coupled to a memory device at a back end. The host can configure the IOE device based on properties of the memory device. For example, the configuration signals from the host can be received on the front end of the IOE device. In previous approaches, the configuration signals can be provided to the memory device even though the configuration signals are not intended to be received by the memory device. As described herein, the configuration signals can be detrimental to the performance or proper behavior of the memory device. In some embodiments, the signal locking component 113 can be utilized to filter or prevent the configuration signals (or other signals, as desired) from being provided to the memory device.

The signal locking component 113 can be configured to identify a first operation command to lock a chip enable signal. In some embodiments, the first operation command can be an existing (e.g., legacy) operation code (OPCODE command) from a host that can be ignored by a memory device (e.g., the plurality of memory dice, etc.). In these embodiments, the operation command can be an instruction to lock the chip enable signal of the IOE device such that subsequent signals received at a chip enable pin of the IOE device are filtered out and prevented from being provided to the plurality of memory dice. In these embodiments, the existing operation code can be safely ignored by the plurality of memory dice. For example, the existing operation code may be received by the plurality of memory dice and ignored such that settings, configuration settings, or other features of the plurality of memory dice are not altered in response to the operation code.

The signal locking component 113 can be configured to lock the chip enable signal to prevent signals associated with a chip enable pin from being transferred to the plurality of memory dice. The signal locking component 113 can lock the chip enable signal of the IOE device in response to receiving the first operation code. In this way, the first operation code can be passed through the IOE device to the plurality of memory dice while subsequent signals received at the chip enable pin can be filtered out to prevent the subsequent signals from being provided to the plurality of memory dice.

The signal locking component 113 can be configured to receive a set of commands via the chip enable pin coupled to a host device. In some embodiments, the set of commands include a volume select command for the IOE device (e.g., memory device interface, etc.) to alter the IOE device based on a quantity of the plurality of memory dice. As used herein, a "volume select command" generally refers to a command that is used to select a particular memory die (LUN) or set of particular memory dies associated with the memory device. For example, a "volume select command" can be issued to select a set of memory dies (LUN), such as the group of LUNs 225-1 illustrated in FIG. 2 for use in a memory operation (e.g., a read, write, copy, etc. operation). In some embodiments, the signal locking component 113 can be configured to reconfigure the IOE device based on the volume select command. In some embodiments, the set of commands can be provided by a host and utilized to configure the IOE device. In this way, the host can send a plurality of different commands to the IOE device without determining how the plurality of different commands will affect the plurality of memory dice since the plurality of different commands will be filtered out by the IOE device prior to being provided to the plurality of memory dice.

The signal locking component 113 can be configured to unlock the chip enable signal to allow signals associated with the chip enable pin to be transferred to the plurality of memory dice. In some embodiments, the signal locking component 113 can receive a second operation command from a host that can indicate that the set of commands have been completed or a process associated with the set of commands is completed. In this way, the signal locking component 113 can unlock the chip enable signal to allow signals received at the chip enable pin to be provided to the plurality of memory dice.

Figure 2:
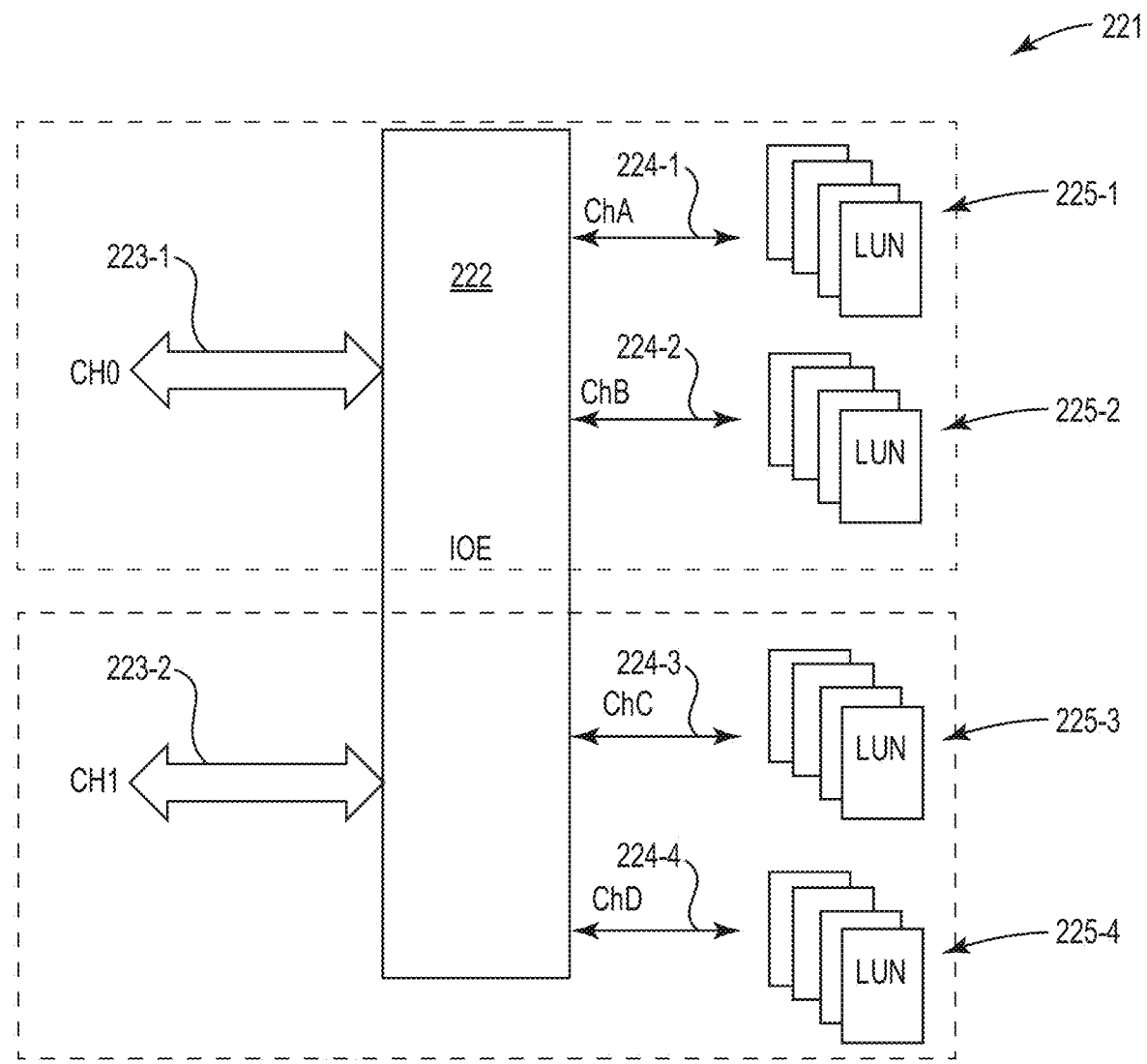
FIG. 2 illustrates a system that includes a multi-channel input/output expander in accordance with some embodiments of the disclosure.

FIG. 2 illustrates a system that includes a multi-channel input/output expander in accordance with some embodiments of the disclosure. The IOE device 222 can include a device that utilizes a first input channel 223-1 and a second input channel 223-2 that can be connected to a host device or host system. In some embodiments, the IOE device 222 can operate in a one channel mode and/or a two channel mode. In these embodiments, the IOE device 222 can utilize only the first input channel 223-1 in the one channel mode and utilize both the first input channel 223-1 and the second input channel 223-2 in the two channel mode. In some embodiments, the second input channel 223-2 is disabled to execute a one channel mode utilizing the first input channel 223-1.

In some embodiments, the IOE device 222 can include a first plurality of output channels 224-1, 224-2 and a second plurality of output channels 224-3, 224-4. In some embodiments, a first output channel 224-1 can be coupled to a first portion of LUNs 225-1, a second output channel 224-2 can be coupled to a second portion of LUNs 225-2, a third output channel 224-3 can be coupled to a third portion of LUNs 225-3, and a fourth output channel 224-4 can be coupled to a fourth portion of LUNs 225-4. In a one channel mode, the first input channel 223-1 can be utilized to access the plurality of LUNs 225-1, 225-2, 225-3, 225-4. In a two channel mode, the first input channel 223-1 can be utilized to access the first portion of LUNs 225-1 and the second portion of LUNs 225-2 through the first plurality of output channels 224-1, 224-2 and the second input channel 223-2 can be utilized to access the third portion of LUNs 225-3 and the fourth portion of LUNs 225-4 through the second plurality of output channels 224-3, 224-4.

In some previous approaches, a host can provide signals to the IOE device 222 through one of the first input channel 223-1 and the second input channel 223-2. In these previous approaches, signals intended for the IOE device 222 can be transferred to one or more of the plurality of LUNs 225-1, 225-2, 225-3, 225-4. As described further herein, the signals intended for the IOE device 222 can cause unexpected or unintended alterations of the plurality of LUNs 225-1, 225-2, 225-3, 225-4. The present disclosure can utilize an IOE device 222 that includes a signal locking component (e.g., signal locking component 113 as referenced in FIG. 1, etc.).

The signal locking component of the IOE device 222 can receive an operation command from one of the first input channel 223-1 or the second input channel 223-2. The IOE device 222 can provide the operation command to one of the plurality of LUNs 225-1, 225-2, 225-3, 225-4 utilizing one or more of a first plurality of output channels 224-1, 224-2 and/or a second plurality of output channels 224-3, 224-4. As described herein, the operation command can be ignored by the plurality of LUNs 225-1, 225-2, 225-3, 225-4.

In some embodiments, the signal locking component can lock a chip enable signal to prevent signals received at a chip enable pin of the first input channel 223-1 or the second input channel 223-2 from being sent to the plurality of LUNs 225-1, 225-2, 225-3, 225-4. In these embodiments, the signals received at the chip enable pin while the chip enable signal is locked can still be utilized by the IOE device 222. That is, a host can provide configuration signals to the IOE device 222 through the first input channel 223-1 and/or the second input channel 223-2 to alter settings of the IOE device and/or configure the IOE device 222 without providing the configuration signals to the plurality of LUNs 225-1, 225-2, 225-3, 225-4.

In some embodiments, the signal locking component can receive a second operation command to unlock the chip enable signal such that subsequent signals received at the chip enable pin are provided to the plurality of LUNs 225-1, 225-2, 225-3, 225-4. In this way, the subsequent signals are not filtered by the IOE device 222 and/or are provided to the plurality of LUNs 225-1, 225-2, 225-3, 225-4 when the host is ready to utilize the plurality of LUNs 225-1, 225-2, 225-3, 225-4.

Figure 3:
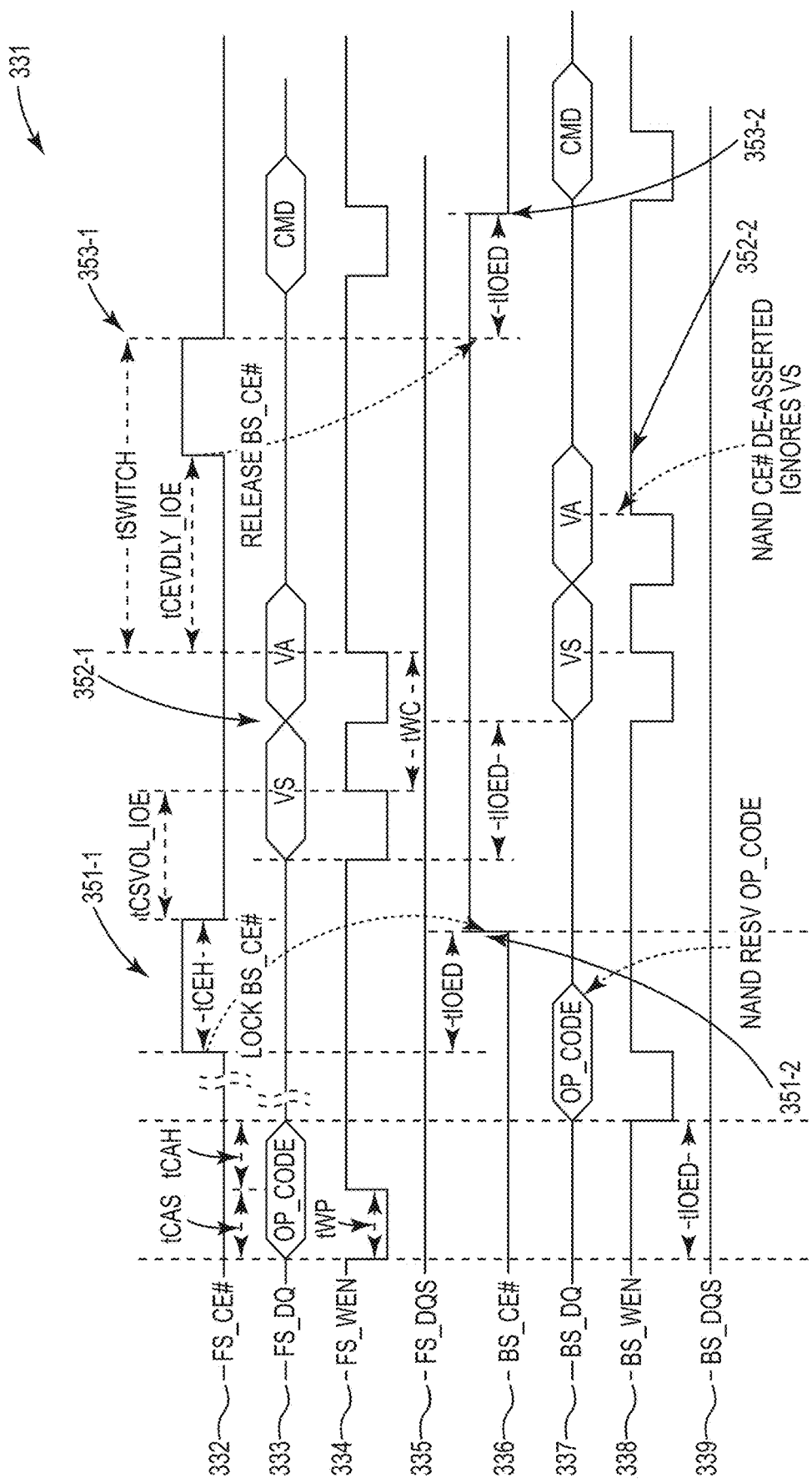
FIG. 3 illustrates timing diagram for signal locking in accordance with some embodiments of the disclosure.

FIG. 3 illustrates timing diagram 331 for signal locking in accordance with some embodiments of the disclosure. In some embodiments, the timing diagram 331 can represent how a plurality of front end signals 332, 333, 334, 335 correspond to a plurality of back end signals 336, 337, 338, 339. That is, the plurality of front end signals 332, 333, 334, 335 can be signals received from a host at a plurality of corresponding signal pins of an IOE device. The timing diagram 331 can illustrate how the IOE device transmits the plurality of front end signals 332, 333, 334, 335 from the host to a plurality of back end signals 336, 337, 338 339 that are provided to memory resources.

In some embodiments, the plurality of front end signals 332, 333, 334, 335 can include a front end chip enable signal 332, a front end (data) DQ signal 333, a front end write enable (WEN) signal 334, and/or a front end data strobe (DQS) signal 335. In a similar way, the plurality of back end signals 336, 337, 338 339 can include signals that correspond to the plurality of front end signals 332, 333, 334, 335. For example, the plurality of back end signals 336, 337, 338 339 can include a back end chip enable signal 336, a back end DQ signal 337, a back end WEN signal 338, a back end DQS signal 339.

As described herein, the IOE device can receive an operation command (OP_CODE) at a front side chip enable pin that can result in the front side chip enable signal 332 going high during the time period marked by 351-1. During this time period 351-1, the back side chip enable signal can be locked. For example, in these embodiments, the back side chip enable signal 336 can be locked or filtered as indicated at 351-2 in response to receiving the OP_CODE and/or the front side chip enable signal 332. During the time span when the back side chip enable signal 336 is locked, beginning at 351-2, signals provided to the front side chip enable pin that generate the front end chip enable signal 332 can be filtered and therefore not have a corresponding signal on the back end chip enable pin, resulting in the back end chip enable signal 336 carrying no information through to the memory device(s).

For example, the front end DQ signal 333 corresponds to issuance of a command 352-1. The command 352-1 can be, in some embodiments, a volume select command, although embodiments are not so limited. The command 352-1 may be directed to the IOE device to configure the IOE device or provide instructions to the IOE device. However, in some embodiments, the command 352-1 may, if received by the memory device, disrupt the functionality of the memory device coupled to the back end of the IOE device. In accordance with the disclosure, when a corresponding back end command 352-2 is issued, such a command is not provided to the memory device(s) because the back end chip enable signal 336 is locked, as described above. In this way, the command 352-2 is filtered from being provided to the memory resource coupled to the back end of the IOE device.

In a similar way to locking the back end chip enable signal 336, the timing diagram 331 illustrates an operation command as a time period 353-1 where the front end chip enable signal 332 goes high. Shortly thereafter, at 353-2, the back end chip enable signal 336 is unlocked and is therefore not utilized in filtering the signals provided to the front end chip enable pin. Thus, once the back end chip enable signal 336 is unlocked, the host can provide signals to the memory resources through the front end chip enable pin of the IOE device and the IOE device will transfer the signals and/or commands to the memory resources.

Figure 4:
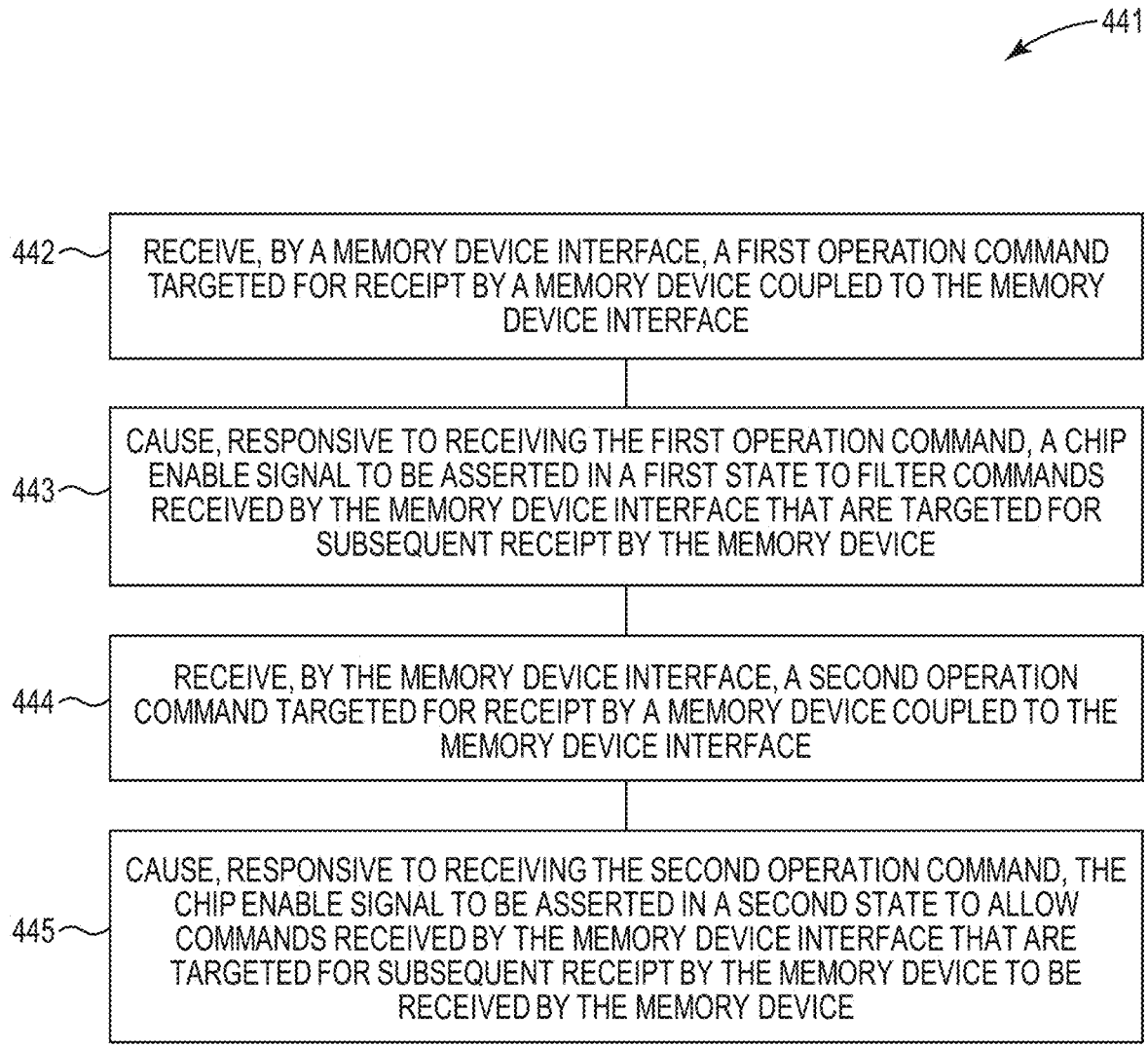
FIG. 4 is a flow diagram corresponding to a method for signal locking in accordance with some embodiments of the disclosure.

FIG. 4 is a flow diagram corresponding to a method 441 for signal locking in accordance with some embodiments of the disclosure. The method 441 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 441 is performed by the signal locking component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 442, the method 441 can be executed to receive, by a memory device interface (e.g., IOE device 222 as referenced in FIG. 2, etc.), a first operation command targeted for receipt by a memory device (e.g., memory device 140 as referenced in FIG. 1, LUN 225-1, 225-2, 225-3, 225-4 as referenced in FIG. 2, etc.) coupled to the memory device interface. As described herein, the first operation command can be an existing (e.g., legacy) command that the memory device is able to ignore or is able to process without altering settings. In some embodiments, the first operation command can be an instruction for the IOE device to lock a chip enable signal such that at least certain commands are prevented from passing through the IOE device to the memory device. In some embodiments, the first operation command can be an indication that a host is performing a configuration of the IOE device and thus the IOE device locks the chip enable signal (e.g., back end chip enable signal 332 as referenced in FIG. 3, etc.) such that the host (e.g., host system 120 as referenced in FIG. 1, etc.) is able to send configuration commands without having the configuration commands reach the memory device.

In some embodiments, the method 441 can be executed to identify a reserved operation command from the host. In these embodiments, the reserved operation command is ignored by the memory device. In these embodiments, the method 441 can be executed to receive a first de-assert signal from the host to lock a chip enable signal to prevent signals associated with a chip enable pin from being transferred to the memory device. In some embodiments, the first de-assert signal is a low to high signal that locks a front end through to a back end. In some embodiments, first de-assert signal does not alter a channel selection or enable logic of the memory device interface.

At operation 443, the method 441 can be executed to cause, responsive to receiving the first operation command, a chip enable signal to be asserted in a first state to filter commands received by the memory device interface that are targeted for subsequent receipt by the memory device. As used herein, subsequent receipt of commands refers to commands and/or signals that are received after the first operation command. In this way, the memory device filters commands that are received after the first operation command. As used herein, the first state of the chip enable signal is a locked state where signals received at the chip enable pin of the front end of the IOE device are filtered and/or prevented from reaching a chip enable pin of the back end. As described herein, filtering the commands includes preventing commands received by the memory device interface from being provided to the memory device. In some embodiments, the chip enable signal can be altered to a high signal or low signal such that the memory device does not receive commands from the host when the IOE device is in the first state.

As described herein, the method 441 can be executed to receive configuration operation commands in response to asserting the first state of the chip enable signal. As used herein, the configuration operation commands can be operation commands provided by a host to configure the IOE device. In some embodiments, configuring the IOE device includes selecting a quantity of memory resources to be utilized for a particular operation or particular time period. For example, the received configuration operation commands include a volume select command to select a quantity of LUNs associated with the memory device. In this example, the quantity of LUNs can be defined at the IOE device by the host utilizing the configuration operation commands.

In some embodiments, the method 441 can be executed to receive a set of commands from the host from the chip enable pin. In some embodiments, the host is configured to identify that the set of commands are commands not to be provided to the non-volatile memory device. For example, the set of commands can be directed to altering settings of the IOE device and not directed to the memory device.

At operation 444, the method 441 can be executed to receive, by the memory device interface, a second operation command targeted for receipt by the memory device coupled to the memory device interface. As described herein, the second operation command can be an operation command that can indicate that the IOE device is to resume sending chip enable signals received at the chip enable pin of the front end to the chip enable pin of the back end to provide the chip enable signals to the memory device.

In some embodiments, the second operation command can be an indication that the host has completed a configuration of the IOE device. That is, the second operation command can be an indication that the communication between the host and the memory device is to be reestablished. In some embodiments, the method 441 can be executed to identify a second de-assert signal from the host to unlock the chip enable signal. That is, the second operation command can be a second de-assert signal from the host. In some embodiments, the first de-assert signal is performed for a first quantity of time and the second de-assert signal is performed for a second quantity of time.

At operation 445, the method 441 can be executed to cause, responsive to receiving the second operation command, the chip enable signal to be asserted in a second state to allow commands received by the memory device interface that are targeted for subsequent receipt by the memory device to be received by the memory device. As used herein, the second state can be the unlocked state of the chip enable signal. As described herein, the second state or unlocked state of the chip enable signal can be utilized to receive chip enable signals from a host and provide the chip enable signals to one or more memory resources of the memory device. In this way, signals that are not intended for the memory device or signals that are specific instructions for the IOE device are prevented from being provided to the memory device to avoid unexpected or undesired alterations of the memory device.

In some embodiments, the method 441 can be executed to unlock the chip enable signal to allow signals associated with the chip enable pin to be transferred to the memory device. In these embodiments, the method 441 can be executed to reconfigure the memory device interface based on the set of commands. In these embodiments, the method 441 can be executed to receive, in response to reconfiguring the memory device interface, a plurality of subsequent commands from the host through the chip enable pin that are provided to the memory device.

In some embodiments, the method 441 can be executed to determine, in response to receiving the second operation command, that a host has completed a configuration of the memory device interface. In some embodiments, the second operation command can be an indication that the host has completed a configuration of the memory device interface (e.g., IOE device, etc.). For example, the host can configure the IOE device by performing a volume select (e.g., by executing a volume select command) as described herein.

In some embodiments, the chip enable signal is asserted in the first state for first period of time and after the first period of time the chip enable signal is asserted in the second state. For example, the chip enable signal can be asserted to the first state after receiving the first operation command. In these embodiments, the first operation command can include a time period for asserting the first state before asserting the second state.

Figure 5:
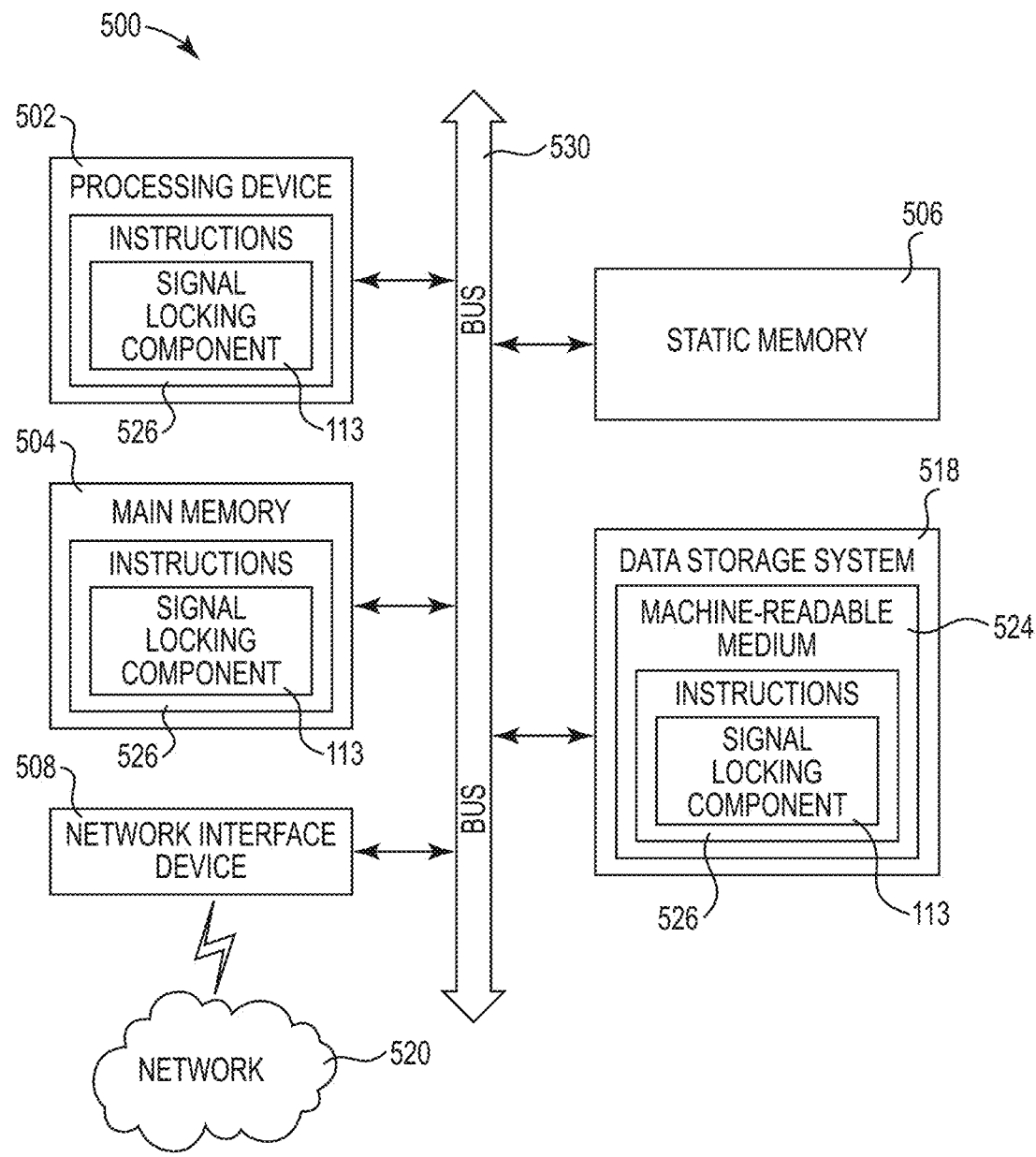
FIG. 5 is a block diagram of an example computer system in which embodiments of the disclosure may operate.

FIG. 5 is a block diagram of an example computer system 500 in which embodiments of the disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the signal locking component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a signal locking component (e.g., the signal locking component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer).

In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving, by a memory device interface, a first operation command targeted for receipt by a memory device coupled to the memory device interface;
causing, responsive to receiving the first operation command, a chip enable signal to be asserted in a first state to filter commands received by the memory device interface that are targeted for subsequent receipt by the memory device;
receiving, by the memory device interface, a second operation command targeted for receipt by the memory device coupled to the memory device interface; and
causing, responsive to receiving the second operation command, the chip enable signal to be asserted in a second state to allow commands received by the memory device interface that are targeted for subsequent receipt by the memory device to be received by the memory device.

2. The method of claim 1, wherein the chip enable signal is asserted in the first state for first period of time and after the first period of time the chip enable signal is asserted in the second state.

3. The method of claim 1, wherein filtering the commands includes preventing commands received by the memory device interface from being provided to the memory device.

4. The method of claim 3, further comprising receiving configuration operation commands in response to asserting the first state of the chip enable signal.

5. The method of claim 4, wherein the received configuration operation commands include a volume select command to select a quantity of LUNs associated with the memory device.

6. The method of claim 1, wherein the first operation command is ignored by the memory device.

7. The method of claim 1, further comprising determining, in response to receiving the second operation command, that a host has completed a configuration of the memory device interface.

8. An apparatus, comprising:
a plurality of memory dice; and
a memory device interface to transfer communication between a host couplable to the memory device interface and the plurality of memory dice, wherein the memory device interface comprises a controller configured to:
identify a first operation command to lock a chip enable signal;
lock the chip enable signal to prevent signals associated with a chip enable pin from being transferred to the plurality of memory dice;
receive a set of commands via the chip enable pin;
identify a second operation command to unlock the chip enable pin; and
unlock the chip enable signal to allow signals associated with the chip enable pin to be transferred to the plurality of memory dice.

9. The apparatus of claim 8, wherein the set of commands include a volume select command for the memory device interface to alter the memory device interface based on a quantity of the plurality of memory dice.

10. The apparatus of claim 9, further comprising the controller configured to reconfigure the memory device interface based on the volume select command.

11. The apparatus of claim 8, wherein the host is to assert the chip enable signal on a front end of the memory device interface in response to sending the first operation command to the memory device interface.

12. The apparatus of claim 11, wherein the set of commands alters a timing or behavior of the plurality of memory dice when received by the plurality of memory dice.

13. The apparatus of claim 8, wherein the set of commands are received at a front end of the chip enable pin and filtered out at a back end of the chip enable pin when the chip enable signal is locked.

14. The apparatus of claim 8, wherein the plurality of memory dice are prevented from registering the set of commands when the chip enable signal is locked.

15. A system comprising:
a memory sub-system comprising a non-volatile memory device; and
a host couplable to the memory sub-system by a memory device interface, the memory device interface comprising a processing device configured to:
identify a reserved operation command from the host, wherein the reserved operation command is ignored by the non-volatile memory device;
receive a first de-assert signal from the host to lock a chip enable signal to prevent signals associated with a chip enable pin from being transferred to the non-volatile memory device;
receive a set of commands from the host from the chip enable pin;
identify a second de-assert signal from the host to unlock the chip enable signal;
unlock the chip enable signal to allow signals associated with the chip enable pin to be transferred to the non-volatile memory device; and
reconfigure the memory device interface based on the set of commands.

16. The system of claim 15, wherein the first de-assert signal is a low to high signal that locks a front end through to a back end.

17. The system of claim 15, wherein the first de-assert signal is performed for a first quantity of time and the second de-assert signal is performed for a second quantity of time.

18. The system of claim 15, further comprising receiving, in response to reconfiguring the memory device interface, a plurality of subsequent commands from the host through the chip enable pin that are provided to the non-volatile memory device.

19. The system of claim 15, wherein the host is configured to identify that the set of commands are commands not to be provided to the non-volatile memory device.

20. The system of claim 15, wherein the first de-assert signal does not alter a channel selection or enable logic of the memory device interface.

* * * * *